United States Patent
Briggs

[15] 3,656,627
[45] *Apr. 18, 1972

[54] COMPOSITE FILTER ASSEMBLY

[72] Inventor: Southwick W. Briggs, Chevy Chase, Md.

[73] Assignee: William Brazerol, Washington, D.C. a part interest

[*] Notice: The portion of the term of this patent subsequent to Feb. 16, 1988, has been disclaimed.

[22] Filed: May 27, 1970

[21] Appl. No.: 41,718

Related U.S. Application Data

[63] Continuation of Ser. No. 780,303, Oct. 14, 1968, abandoned, Continuation-in-part of Ser. No. 653,712, June 17, 1967, abandoned.

[52] U.S. Cl. ............................ 210/315, 210/388, 210/488, 210/493
[51] Int. Cl. ...................................................... B01d 25/18
[58] Field of Search ............... 210/315, 484, 338, 488, 457, 210/489, 492, 490, 493; 55/278, 488, 489, 498, 486

[56] References Cited

UNITED STATES PATENTS

| | | | |
|---|---|---|---|
| 3,182,800 | 5/1965 | Kasten et al. | 210/315 X |
| 3,117,925 | 1/1964 | Kasten | 210/96 |
| 3,298,522 | 1/1967 | Muller | 210/90 |

Primary Examiner—J. L. Decesare
Attorney—Stepno & Neilan

[57] ABSTRACT

A radial flow filter having fixed end caps, a first filter comprising a stack of annular disks having their outer edges secured in fixed position are disposed between the end caps, and a second filter composed of pleated paper is disposed concentrically around the disks, or alternatively is disposed within the disks.

10 Claims, 5 Drawing Figures

PATENTED APR 18 1972

3,656,627

INVETOR
SOUTHWICK W. BRIGGS

BY
ATTORNEY

3,656,627

COMPOSITE FILTER ASSEMBLY

CROSS REFERENCE TO RELATED APPLICATION

This application is a continuation of copending application Ser. No. 780,303 filed Oct. 14, 1968, which in turn is a continuation in part of copending application Ser. No. 653,712 filed July 17, 1967, both now abandoned.

The present invention relates to a composite filter assembly comprising a first filter comprising a stack of annular disks of a suitable filter medium and a second filter comprising a pleated paper filter disposed concentrically around the first filter, or alternatively within the first filter. The flow of oil or other fluid to the filter is radially inwardly into a pervious center conduit leading to a discharge outlet in one of the end caps.

It is an essential feature of the invention that the outer periphery of each of the annular disks is adhesively or otherwise fixed in position, for example, by being secured to an annular perforated member.

Although disk pack filters are known in the prior art, heretofore, the outer edges of the disks have not been secured, and the stack of disks was free to expand and contract. Usually, a take-up harness or other spring arrangement is employed in known disk pack filters to adjust the height of the disk pack. When oil flows through the disk pack, the fluid pressure expands the disk pack against the action of the harness, and when the fluid pressure ceases, the harness compresses the disk pack. However, with such prior art arrangements, it has been found that the fluid pressure frequently opens channels through the disk pack through which the oil flows without being filtered. Furthermore, the prior art take-up harness or other spring means associated with one of the end plates of the disk pack, when the fluid pressure is removed, may compress the disk pack too much so that the flow path between adjacent disks are closed, or the harness may fail to compress the disk pack to its original size. In the latter case, channels will eventually form through which liquid will flow without being filtered.

In contradistinction, the present invention employs annular disks which are secured at their outer periphery to relatively rigid means so that the outer peripheries of the disks are fixed relative to each other.

It is a further feature of the invention that no take-up harness or similar spring means is required to compensate for changes in the height of the stacked annular disks.

The annular filter disks may be employed to remove particles of one size distribution, for example, relatively fine particles from the fluid being filtered. The pleated paper second filter is preferably employed to remove particles of a different size distribution, for example, more coarse particles. In this way, the composite filter assembly of the invention may be designed to selectively remove particles of different sizes.

Tests have shown that the composite filter assembly of the invention is superior in operating characteristics to prior art filters including a conventional prior art all pleated paper filter of the same outside dimensions as the composite filter assembly of the invention.

On the basis of preliminary test data under actual operating conditions, it has been concluded that the composite filter assembly of the invention, when employed as an oil filter in locomotives in place of a commercially available pleated paper filter, increases filter life from two to three times. Although the initial cost of the composite filter of the invention is higher, this higher initial cost is more than compensated for by the increased life which leads to reduced maintenance costs and increased operating time before a locomotive is removed from service.

It is a principal object of the present invention to provide a composite filter assembly having superior operating characteristics and longer life.

Another object of this invention is to provide a composite filter assembly including a pleated paper filter which removes coarse particles from the fluid being filtered and a stacked annular disk filter which removes finer particles from the fluid being filtered.

A further object of the invention is to provide a composite filter including a stacked annular disk filter which does not require a take-up harness or similar means to compensate for changes in height of the stack of annular disks.

The above and other objects, features and advantages of the invention will become more apparent as this description proceeds and from the accompanying drawings wherein.

Figure 1:
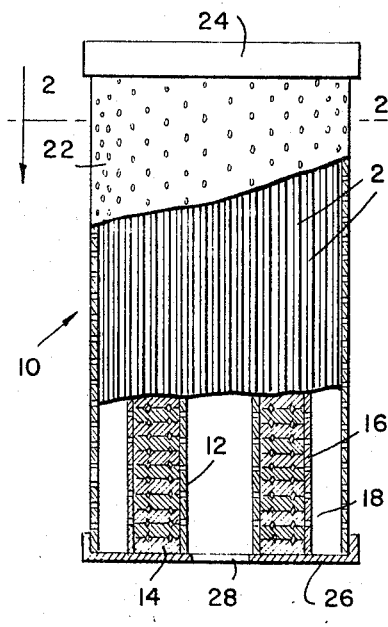
FIG. 1 is a elevational view, partly in section, of one embodiment of the invention wherein a pleated paper filter is disposed around a stack of annular filter disks.

Referring now to the drawings and more particularly to FIG. 1, reference numeral 10 generally designates a composite filter assembly in accordance with one embodiment of the invention. In this embodiment, a relatively rigid perforated center tube 12 is surrounded by a stack of annular filter disks or elements 14 which constitute the inner filter of the composite filter assembly. The outer peripheries of the disks 14 are held in fixed position relative to each other, preferably by being adhesively or otherwise suitably secured to a relatively rigid perforated annular casing 16.

The second or outer filter of this embodiment is constituted by a pleated paper filter medium 18 which has a plurality of pleats 20. The filter medium 18 is disposed between the casing 16 and a fluid pervious outer wrap 22.

The opposite ends of the perforated center tube 12, the perforated tubular casing 16, and the outer wrap 22 are secured to an upper end cap 24 and to a lower end cap 26. The lower end cap has a central opening 28 which constitutes a discharge port for the fluid which has flown through the filter assembly into the perforated center tube 12.

Figure 2:
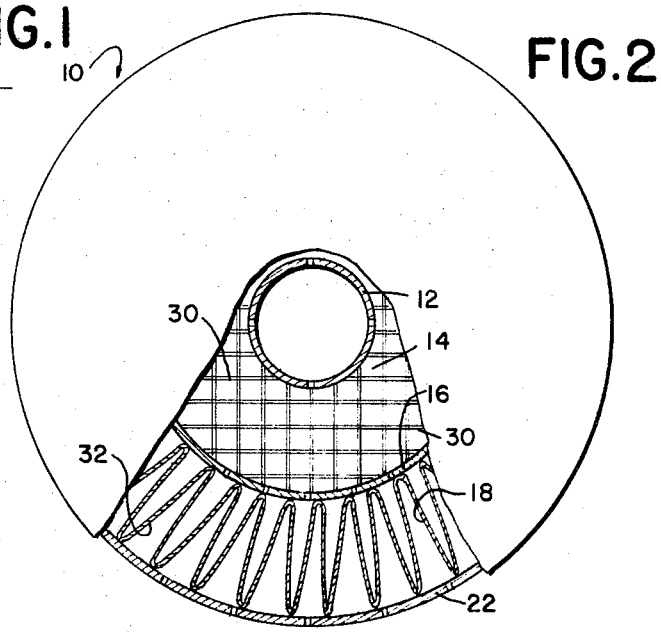
FIG. 2 is a part plan view, part horizontal sectional view taken on the line 2—2 of FIG. 1, on an enlarged scale.

Referring now to FIG. 2, the disks 14 are preferably cross-embossed to provide therebetween a network of intersecting channels or grooves 30 through which fluid may flow to the perforated center tube 12. The disks may be made of any suitable fibrous material known in the art for use in such filters. Preferably, the disks are made of cotton paper of about 30 point which is lofted to about 35 point in the embossing process to form the grooves 30. While not wishing to be bound by any particular theory, it is theorized that the stacked disks 14 function to remove fine carbon particles and the like from the fluid being filtered by entrapping the particles on the surface of the disks rather than by filtering out the particles in a conventional sense. For this reason, imparting irregularities to the surface of the disks, for example, the grooves 30, is preferred to employing disks having substantially smooth surfaces. On the other hand, if the disks are made of a so-called "open" material such as 160 pound basis weight 60 or 70 point all cotton linter paper, such a material has sufficient surface irregularities to entrap particles on its surface.

The annular disks 14 may be secured to the perforated casing 16 in any suitable manner. By way of example, the annular disks may be positioned upon a vibrating mandrel in order to initially space the disks in the desired relationship to each other. This assembly may then be inserted into the perforated casing 16 which may have an adhesive on its inner surface. The mandrel is thereafter removed, and the perforated center tube 12, which is not adhesively secured to the disks is inserted. Any suitable adhesive which will withstand the operating conditions may be employed. One suitable adhesive is a polyvinyl acetate-phenolic resin adhesive containing a buffer to prevent precipitation of the resinous materials. The casing 16 to which the outer peripheries of the annular disks 14 are bonded must be of sufficient rigidity to withstand the operating pressures while maintaining the preset spacing of the disks.

If desired, the filter disks 14 and the pleated paper filter 18 may be partially or completely impregnated with a phenol formaldehyde resin or other suitable thermosetting resin in order to provide increased rigidity and resistance to the hot materials to be filtered.

In order to further improve the filtering ability of the annular disks 14 and fluid distribution through the spacings between the disks to the center tube 12, it is within the purview of the present invention to rotate each disk relative to the adjacent disk.

Figure 3:
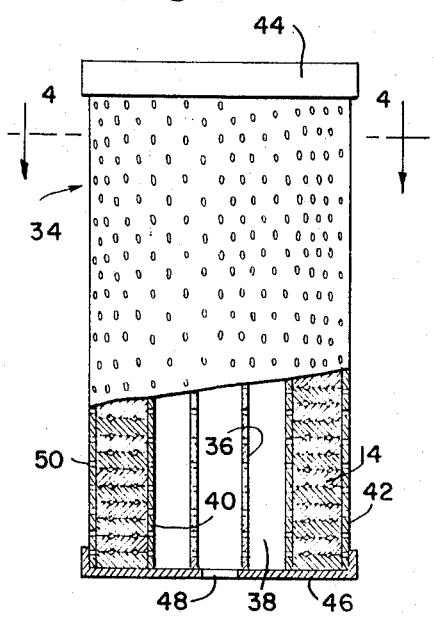
FIG. 3 is a elevational view, partly in section, of another embodiment of the present invention showing a pleated paper filter disposed within a stack of annular filter disks.
Figure 4:
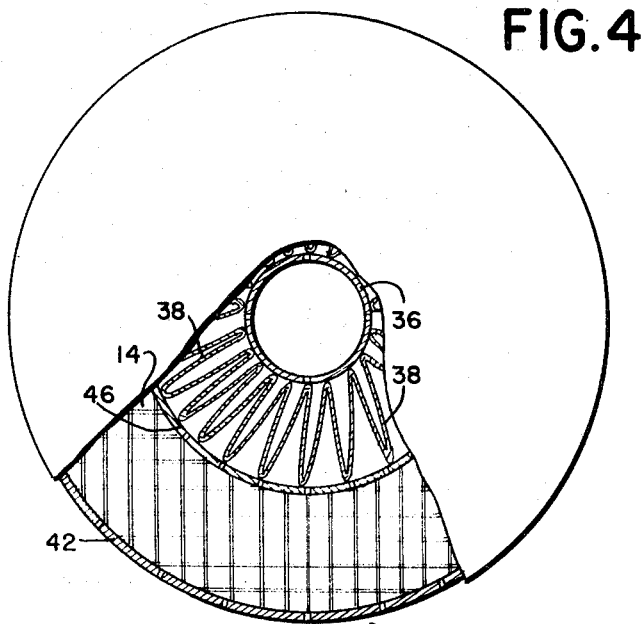
FIG. 4 is a part plan view, part horizontal sectional view taken on the line 4—4 of FIG. 3, on an enlarged scale.
Figure 5:
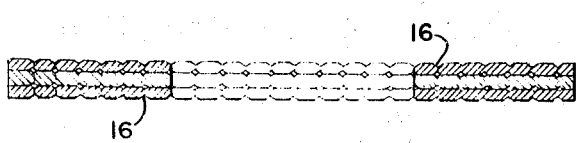
FIG. 5 is a vertical cross sectional view, on an enlarged scale, of several stacked filter disks of the FIG. 3 embodiment showing grooves provided in the filter disks.

Another embodiment of the invention is illustrated in FIGS. 3 – 5 wherein reference numeral 34 generally designates a composite filter assembly wherein the outer filter is constituted by a plurality of stacked annular disks 14 having their outer ends adhesively or otherwise suitably fixed to the inner surface of a relatively rigid outer casing 42 having perforations 50. Disposed within the filter constituted by the filter disks is a pleated paper filter 38 which is secured between a perforated intermediate tubular member 40 and a perforated center tube 36. The opposite ends of outer casing 42, intermediate tubular member 40, and the center tube 36 are secured to an upper end cap 44 and a lower end cap 46 which is provided with a discharge port 48. It will of course be appreciated that in this embodiment, it is the outer casing 42 which is the relatively rigid member which maintains the outer peripheries of the annular disks in fixed spaced relationship. In this embodiment, like in the embodiment described previously, no take-up harness or similar means is necessary.

The annular filter disks 14 are depicted on a somewhat larger scale in stacked relationship in FIG. 5 which illustrates channels or grooves 52 provided in the surfaces of the filter disks, for example, by cross embossing the surfaces of the filter disks in order to improve the fluid flow between the disks 14.

The operation of this embodiment is similar to that of the embodiment of FIG. 1 except that the oil or other fluid to be filtered initially flows through the stacked annular disks, and thereafter through the pleated paper filter to the perforated central tube 36, and from there to the discharge port 48 for recirculation.

The superiority of a composite filter assembly in accordance with the present invention will be further apparent from the following comparative data. Tests were conducted employing a standard pleated paper filter intended for use in locomotives with a composite filter assembly of the present invention of the same length and diameter. In the composite filter assembly, an annular disk filter was disposed within a pleated paper filter. The tests were conducted under actual operating conditions upon a two cycle 1,500 horsepower diesel locomotive employing a standard mineral detergent type oil. The locomotive was approximately 10 years old. The pleated paper filter had a life of about 1 month, and the pentane number at the end of this period was approximately 0.15 – 0.17. This pleated paper filter was then removed and replaced by a composite filter in accordance with the invention. After 30 days, the pentane number decreased to 0.03 followed by a further decrease to 0.01 after 60 days, and at 90 days, there was only a trace amount of precipitates developed in this test. There was still full flow through the composite filter assembly.

The pentane number was determined by mixing 10 cubic centimeters of the filtered oil with 90 cubic centimeters of pentane, centrifuging, and determining the amount of deposit in the bottom of the centrifuge tube.

In addition to a three fold or more increase in life, it is apparent that the composite filter assembly of the present invention which provided oil having a substantially lower pentane number was significantly more effective in removing impurities from the oil. The reduction in pentane number with time is believed to be due to the filter of the invention continuing to remove particles from the oil which was dirty at the time the test was started.

Another series of corresponding comparative tests were conducted employing a 3,000 horsepower two cycle diesel locomotive. In this case, an ashless oil was employed, and a spectrograph measured the parts per million of metal from the engine parts etc., found in the oil. Employing the pleated paper filter, the normal iron content was in the range 37 – 56 ppm. compared to about 18 ppm. using the composite filter assembly of the invention. The silica content of the oil employing the pleated paper filter was in the range 3 – 7 ppm. whereas with the filter of the invention no silica was detected. The filter of the invention ran for 6 months versus a normal life of about 3 months for the commercially available pleated paper filter.

The reduction in the amount of iron present in the oil employing the filter of the invention indicates that there was less engine wear which in turn is indicative that the filter removed more abrasive substances which cause engine wear. The absence of silica in the oil indicates that fine dust normally found in oil from sand applied to the railroad tracks was removed from the oil by the filter of the invention.

While preferred embodiments of the invention have been shown and described, it will be appreciated that minor changes and modifications may suggest themselves to those of ordinary skill in the art upon being apprised of the present disclosure. For example, in lieu of the perforated cylindrical members to which the outer peripheries of the annular filter disks are secured, wire mesh or similar means may be provided to which the periphery of the annular disks may be secured. It is intended to encompass all such changes and modifications as fall within the scope and spirit of the appended claims.

What is claimed is:

1. A composite filter assembly comprising a pair of end caps, a pervious center tube communicating with a discharge port provided in one of said end caps, and first and second filters disposed concentrically around said center tube and extending between said end caps, said first filter comprising a stack of thin annular disks of filter paper, each of said annular disks having a pair of oppositely disposed side surfaces, said annular disks being stacked in compression one upon the other in contacting face to face relationship between said end caps, fluid pervious support means bonded to the outer peripheries of said annular disks to maintain the outer periphery of each of said annular disks in fixed relationship to each other and to maintain said annular disks in compression, and said second filter comprising a pleated paper filter.

2. A composite filter assembly according to claim 1, wherein said second filter is disposed around said support means, and wherein said annular disks are made of 60– 70 linter paper.

3. A composite filter assembly according to claim 2, wherein said support means comprise a perforated relatively rigid casing, said annular disks being made of flexible cotton paper, and means securing the outer periphery of each of said annular disks to said casing.

4. A composite filter assembly according to claim 1, further comprising intersecting grooves provided in the surfaces of said annular disks.

5. A composite filter assembly according to claim 1, further comprising means to maintain said end caps in fixed position relative to each other.

6. A composite filter assembly according to claim 1, wherein said support means comprise a perforated relatively rigid casing and adhesive means at the outer periphery only of said annular disks securing the outer periphery of each of said annular disks to said casing, said annular disks being flexible and being unsecured at their inner peripheries, and means including said casing to maintain said end caps in fixed position relative to each other.

7. A composite filter assembly according to claim 1, wherein said first filter is disposed concentrically about said second filter.

8. A composite filter assembly according to claim 7, further comprising grooves provided in the surfaces of said annular disks.

9. A composite filter assembly according to claim 7, further comprising means to maintain said end caps in fixed position relative to each other.

10. A composite filter assembly according to claim 7, wherein said support means comprise a perforated relatively rigid casing secured to the outer periphery of each of said annular disks.

* * * * *